United States Patent [19]

Heinemann et al.

[11] Patent Number: 5,594,066
[45] Date of Patent: Jan. 14, 1997

[54] LOW-VISCOSITY, STABLE, AGGLOMERATE-FREE POLYMER POLYOLS, A PROCESS FOR THEIR PREPARATION AND THEIR USE IN PRODUCING POLYURETHANE PLASTICS

[75] Inventors: Torsten Heinemann, Cologne; Manfred Dietrich, Leverkusen; Gundolf Jacobs, Rösrath; Mark Kratz, Krefeld; Josef Sanders, Leverkusen; Uwe Scholz, Cologne; Helmut Woynar, Dormagen, all of Germany

[73] Assignee: Bayer Aktiengesellschaft, Leverkusen, Germany

[21] Appl. No.: 518,370

[22] Filed: Aug. 23, 1995

[30] Foreign Application Priority Data

Sep. 2, 1994 [DE] Germany .......................... 44 31 226.1

[51] Int. Cl.$^6$ ..................................................... C08G 18/48
[52] U.S. Cl. ................... 524/761; 525/131; 252/182.25; 252/182.27; 528/76; 521/137
[58] Field of Search ........................... 525/131; 524/761; 252/182.27, 182.25; 528/76; 521/137

[56] References Cited

U.S. PATENT DOCUMENTS

| Re. 33,291 | 8/1990 | Ramlow et al. ...................... 521/137 |
|---|---|---|
| 3,383,351 | 5/1968 | Stamberger .......................... 260/33.2 |
| 3,523,093 | 8/1970 | Stamberger ........................... 260/2.5 |
| 3,823,201 | 7/1974 | Pizzini et al. ........................ 260/861 |
| 3,850,861 | 11/1974 | Fabris et al. .......................... 260/2.5 |
| 4,230,823 | 10/1980 | Alberts et al. ........................ 521/137 |
| 4,342,840 | 8/1982 | Kozawa et al. ....................... 521/137 |
| 4,390,645 | 6/1983 | Hoffman et al. ...................... 521/137 |
| 4,689,354 | 8/1987 | Ramlow et al. ....................... 521/137 |
| 4,824,919 | 4/1989 | Baker et al. .......................... 525/502 |

FOREIGN PATENT DOCUMENTS 61115919  6/1995  Japan .

*Primary Examiner*—Rachel Gorr
*Attorney, Agent, or Firm*—Joseph C. Gil; N. Denise Brown

[57] ABSTRACT

Stable, agglomerate-free, low-viscosity graft copolymer dispersions are prepared by the radical polymerization of 25 to 65% by weight of ethylenically unsaturated monomers in the presence of a base polyol, a macromer, a low-molecular weight regulator and, optionally, an organic solvent. The dispersions of this process are suitable as a polyol component for the production of polyurethane plastics by the isocyanate addition process.

9 Claims, No Drawings

LOW-VISCOSITY, STABLE, AGGLOMERATE-FREE POLYMER POLYOLS, A PROCESS FOR THEIR PREPARATION AND THEIR USE IN PRODUCING POLYURETHANE PLASTICS

BACKGROUND OF THE INVENTION

Polymer polyols in the context of this invention are understood to be products which are obtained by the polymerization of ethylenically unsaturated compounds in high molecular weight polyols. These may be used, for instance, to produce polyurethane flexible foams. The ethylenically unsaturated compounds mainly used are the monomers styrene and acrylonitrile which are radically polymerized in polyether-polyols.

The preparation of this type of polymer polyol is described in, for example, U.S. Pat. Nos. 3,383,351, and 3,523,093, or German Auslegeschrift 2,837,026.

The most important objectives when preparing polymer polyols are to achieve high solids contents (at least 40%) for high proportions of styrene (at least 60 parts by weight of monomers), the lowest possible viscosity and excellent product stability at the same time.

In order to achieve this product stability, i.e. to prevent the build-up of undesired agglomerated polymer particles being deposited out of the continuous phase, the polyether polyol, the polymer particles must be stabilized during preparation of the polymer polyol. This stabilization can be achieved by also polymerizing a compound which contains ethylenically unsaturated, polymerizable groups, and which is compatible with the polyether polyol phase, as a stabilizer, to form so-called macromonomers or macromers. These macromers copolymerize with the vinyl monomers such that the polymer particles produced are sterically stabilized by means of side chains and are thus protected against agglomeration and deposition.

The production of polymer polyols by incorporating macro-monomers is described in, for example, U.S. Pat. Nos. 3,850,861, 3,823,201, 4,689,354, 4,342,840, and Reissue 33,291. The ethylenically unsaturated double bonds are introduced into polyether polyols, for example, by reaction with cyclic, unsaturated acid anhydrides such as maleic anhydride, followed by reaction with ethylene oxide; by reaction with an unsaturated epoxide such as allylglycidyl ether. Japanese Patent 61,115,919 describes polyols which are obtained by incorporating macromonomers with a molar mass of 700 to 3500 g/mol, which are obtained, for example, by reacting TDI, hydroxyethyl methacrylate and a polyether polyol in equimolar proportions.

U.S. Pat. No. 4,390,645 describes the preparation of macro-monomers by reacting polyalkylene oxides with unsaturated, radically polymerizable isocyanates such as 2-isocyanatoethyl methacrylate.

Even though all the methods mentioned lead to polymer polyols which basically can be used as polyol components in polyurethane flexible foams, further improvements are desirable. Some methods for preparing the macromonomers are complicated, the viscosities mentioned in the literature are often relatively high and small agglomerated polymer particles are frequently observed when discharging the products, i.e. the stability of the products, as can be seen from the comparison examples, is not adequate.

The basic object of the invention is, therefore, to provide a new process for preparing low-viscosity, stable, agglomerate-free polymer polyols. This object can be achieved using the invention described in more detail in the following.

SUMMARY OF THE INVENTION

The present invention is a process for the preparation of stable, agglomerate-free, low-viscosity graft copolymer dispersions by radical polymerization of 25 to 65% by wt., based on the total weight of the dispersion, of ethylenically unsaturated monomers in the presence of a base polyol, a macromer, and a low-molecular weight regulator wherein said macromer has a molecular weight of 4700 to 15000 (g/mol) and a functionality of 2 to 6 and said macromer is prepared by the reaction of a polyol with an isocyanate which is the reaction product of ethylenically unsaturated low-molecular weight monohydroxy acrylates with polyisocyanates and said macromer contains 0.1 to 1 mole of double bonds per mole of polyol. Optionally, the polymerization may additionally occur in the presence of an organic solvent.

According to the invention, it is preferred that a) the ethylenically unsaturated monomers comprise styrene and/or acrylonitrile.

b) the ethylenically unsaturated monomers comprise a mixture of styrene and acrylonitrile in the ratio of 20:80 to 80:20 parts by weight, most preferably 70:30 to 30:70 parts by weight.

c) the base polyol comprises a polyalkylene oxide having at least two hydroxyl groups, a functionality of 2.5 to 6 and an OH value of 20 to 100.

d) the low-molecular weight regulator is selected from the group consisting of methanol, ethanol and isopropanol.

The present invention also relates to stable, agglomerate-free, low-viscosity graft copolymer dispersions produced by the process according to the invention, and to the production of polyurethane plastics by the isocyanate polyaddition process wherein the polyol component comprises the graft copolymer dispersions produced according to the present invention.

Suitable polyols to be used as base polyols in the present invention contain at least two hydroxyl groups, and are preferably polyether polyols such as, for example, addition products known per se of cyclic ethers such as ethylene oxide, propylene oxide, styrene oxide, butylene oxide with starter compounds such as, for example, polyhydroxy compounds such as alkylene glycols, glycerine, trimethylolpropane, pentaerythritol, sorbitol, and amines such as ethylene diamine or toluylene diamine. The polyether polyols suitable as a base polyol in accordance with the present invention preferably have functionalities of 2.5 to 6 and an OH value of 20 to 100. The polyether chains are preferably built up from propylene oxide and ethylene oxide units. However, polyester polyols having functionalities of preferably 2.5 to 6 and an OH value of 20 to 100 may also be considered as suitable base polyols.

The polymer polyols are produced by the radical polymerization of ethylenically unsaturated monomers or mixtures of ethylenically unsaturated monomers in the polyether polyols described as base polyols above. Examples of this type of monomer include butadiene, styrene, α-methylstyrene, methylstyrene, ethylstyrene, acrylonitrile, methacrylonitrile, methyl methacrylate, and acrylates. Styrene and acrylonitrile are preferably used. The amount of ethylenically unsaturated monomers is 25 to 65wt.%, based on the total weight of the dispersion. When using styrene and acrylonitrile, the ratio of these two monomers is preferably 20:80 to 80:20, most preferably 70:30 to 30:70 (parts by weight).

Initiation of the radical polymerization takes place with conventional radical-forming initiators. Examples of this type of initiator include organic peroxides such as benzoyl peroxide, tert-butyl octoate, didecanoyl peroxide; and azo compounds such as azoisobutyronitrile or 2,2'-azobis-(2-methylbutyronitrile).

The polyols suited for the preparation of macromers used in the process of the present invention include, for example, the known polyols, preferably polyether polyols, such as the known addition products of cyclic ethers such as ethylene oxide, propylene oxide, styrene oxide, butylene oxide, etc. with starter compounds such as, for example, polyhydroxy compounds including alkylene glycols, glycerine, trimethylol-propane, pentaerythritol, sorbitol, and amines such as, for example, ethylene diamine or toluylene diamine. The polyether polyols used in the preparation of the macromers have functionalities of 2 to 6 and a molecular weight of 4500 to 15,000 g/mol. The polyether chains are preferably built up from propylene oxide and ethylene oxide units.

The ethylenically unsaturated groups can be introduced into the polyol to form the macromer as described in the processes known in the literature. The macromer formation is preferably via the reaction of the base polyol with an isocyanate which is the reaction product of a polyisocyanate with an ethylenically unsaturated, low-molecular weight monohydroxy acrylate. Polyisocyanates which may be used include, for example, toluylene diisocyanate, hexamethylene diisocyanate, diphenyl-methane diisocyanate, isophorone diisocyanate, napthalene diisocyanate.

Low-molecular weight monohydroxy acrylates which may be used include, for example, hydroxyethyl acrylate, hydroxypropyl acrylate, hydroxyethyl methacrylate, and hydroxybutyl acrylate.

The macromers contain as a statistical average from 0.1 to 1 mole of double bonds per mole of polyol.

The low-molecular weight regulators to be used in accordance with the present invention include in particular alcohols such as, for example, methanol, ethanol, isopropanol, butanols and butanediol, mercaptans, allyl compounds, and enolethers such as, for example, (cyclohex-3-enyliden-methoxymethyl)benzene.

It is also within the scope of the present invention that organic solvents may be present in the process according to the invention. Suitable organic solvents include hydrocarbons such as, for example, toluene, ethylbenzene, isopropylbenzene, xylenes, ketones such as, for example, acetone, and methylethyl ketone. Preferred solvents are toluene and ethylbenzene.

The process according to the invention may be operated either on a discontinuous basis or on a continuous basis. It is within the scope of the invention, for example, to meter-in a mixture which contains the ethylenically unsaturated monomers, the initiator, solvent and optionally some of the base polyol into a reactor, fitted with a stirrer, which contains the preheated polyether (base polyol), the macromer and the low molecular weight regulator. Another possibility is to add the low molecular weight regulator and some of the macromer to the mixture to be metered-in.

In addition, a mixture of all the reaction components can be continuously metered into a reactor, and the product can likewise be taken from an overflow.

The temperature at which polymerization is carried out is normally 80° to 140° C., preferably 90° to 130° C.

Following completion of the polymerization reaction, the product is usually purified by separating readily volatile constituents such as, for example, residual monomers, solvent and regulator residues by vacuum distillation.

The polymer polyols produced in accordance with the process according to the invention are particularly suitable for the manufacture of polyurethane plastics by the isocyanate polyaddition process. These polymer polyols are free of polymer agglomerates, are stable, and have low viscosities.

The manufacture of polyurethane plastics, preferably, flexible polyurethane foams comprises reacting a) organic polyisocyanates, with b) polymer polyols produced according to the invention, optionally in the presence of c) other high-molecular weight and/or low-molecular weight compounds containing hydrogen atoms reactive with isocyanate groups, d) catalysts, e) water and/or low-boiling hydrocarbons as blowing agent and f) auxiliary agents and/or additives.

In the manufacture of polyurethane plastic materials, the following components are suitable for use as base components.

Suitable isocyanates include, for example, the aliphatic, cyclo-aliphatic, araliphatic, aromatic and heterocyclic polyisocyanates such as those described by, for example, W. Siefgen in Justus Liebigs Annalen der Chemie, 362, pages 75 to 136. These polyisocyanates include those compounds of the general formula:

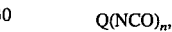

wherein n represents a number from 2 to 5, preferably 2 to 3; and

Q represents an aliphatic hydrocarbon radical having 2 to 18, preferably 6 to 10 carbon atoms, a cycloaliphatic hydrocarbon radical having 4 to 15, preferably 5 to 10 carbon atoms, an aromatic hydrocarbon radical having 6 to 15, preferably 6 to 13 carbon atoms.

Such polyisocyanates are specified in, for example, German OS 2,832,253, pages 10 to 11.

Normally, the technically easily accessible polyisocyanates are particularly preferred. These include compounds such as, for example, 2,4- and 2,6-toluylene diisocyanate, as well as any mixtures of these isomers ("TDI"), diphenylmethane diisocyanate ("MDI") and polyphenylpolymethylene polyisocyanates such as those which are produced by aniline/formaldehyde condensation and subsequent phosgenation. It is also possible to use polyisocyanate commonly referred to as the "modified polyisocyanates". These modified polyisocyanates may contain carbodiimide groups, urethane groups, allophanate groups, isocyanurate groups, urea groups, and/or biuret groups. These include the modified polyisocyanates which are derived from 2,4- and/or 2,6-toluylene diisocyanate, or 4,4'- and/or 2,4'-diphenyl-methane diisocyanate.

The polymer polyols produced by the process of the present invention are suitable active hydrogen containing materials to be used in the production of polyurethane plastic materials.

In addition to the polymer polyols, it is also possible to optionally include organic compounds having at least 2 hydrogen atoms reactive with isocyanate groups and having molecular weights of 40 to 10,000 g/mol as base components. These are preferably polyether polyols and include the known addition products from the reaction of cyclic ethers such as, for example, ethylene oxide, propylene oxide, styrene oxide, butylene oxide, etc. with starter compounds including, for example, polyhydroxy compounds such as, for example, alkylene glycols, glycerine, trimethylolpropane, pentaerythritol, sorbitol, etc., amines such as, for example, ethylene diamine, toluylene diamine, etc., as well as the starter compounds themselves.

Suitable catalysts for the manufacture of polyurethane plastic materials include, for example, the conventional catalysts which are known per se from polyurethane chemistry may optionally be used.

It is also possible to include water and/or low-boiling hydrocarbons as blowing agents. Suitable examples of low-boiling hydrocarbons include the low-boiling alkanes such as, for example, pentane, cycloalkanes such as, for example, cyclopentane, alkenes, etc., as well as gases, such as, for example, carbon dioxide, which can be introduced into the reaction mixture under pressure.

Other known auxiliary agents and additives may also optionally be incorporated into this reaction mixture to produce polyurethane plastic materials. These include, for example, surface-active additives such as emulsifiers and foam stabilizers, reaction inhibitors, cell regulators of the type known per se such as, for example, paraffins, fatty alcohols or dimethylpolysiloxanes, as well as pigments, colorants, and flame retardants of the type known per se, also stabilizers against the effects of ageing and weathering (environmental factors), softeners and anti-fungal and anti-bacterial substances.

Suitable examples of optional additives and auxiliary agents such as surface active additives and foam stabilizers, reaction inhibitors, stabilizers, flame retardants, softeners, dyestuffs, as well as anti-fungal and anti-bacterial substances optionally incorporated according to the invention, as well as details about the method of application and the effectiveness of these additives are discussed in detail in Kunststoff-Handbuch, Vol. VII, edited by G. Oertel, Carl Hanser Verlag, Munich, 1993, e.g. on pages 104 to 127.

The manufacture of flexible expanded polyurethanes occurs through the known methods such as is described in, for example, Kunststoff-Handbuch, Vol. VII, edited by G. Oertel, Carl Hanser Verlag, Munich, 1993, e.g. on pages 139 to 263.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following components are used in the process of the present invention:

Polyol A: A sorbitol started polyether, produced by the addition of polypropylene oxide and ethylene oxide, and having a molecular weight of 12,020 g/mol.

Polyol B: A glycerine started polyether, produced by the addition of polypropylene oxide and ethylene oxide, and having a molecular weight of 5430 g/mol.

Polyol C: A polypropylene oxide blocked glycerine started polyether, produced by the addition of polypropylene oxide and ethylene oxide, and having a molecular weight of 3000 g/mol.

Polyol D: A sorbitol started polyether, produced by the addition of polypropylene oxide and ethylene oxide, and having a molecular weight of 12,020 g/mol.

Macromer A: The reaction product of polyol D with maleic anhydride, and then ethylene oxide, and having 0.75 moles of double bonds per mole macromer.

Example 1

The preparation of an isocyanate which was to be subsequently used to form a macromer by the introduction of ethylenically unsaturated double bonds into polyols:

To a flask containing 88 g of toluylene diisocyanate was slowly added, dropwise at 80° C., with stirring, 65 g of hydroxypropyl acrylate. A clear liquid with an NCO content of 13.7 % was obtained.

Example 2

The preparation of a macromer according to the invention (Macromer B) (a polyol having ethylenically unsaturated terminal groups):

9.4 g of the isocyanate obtained from Example 1 was added to a flask containing 500 g of Polyol A, at 70° C. A clear liquid with a viscosity of 2300 mPa.s/25° C. resulted.

Example 3

The preparation of a macromer according to the invention (Macromer C) (a polyol having ethylenically unsaturated terminal groups):

20 g of the isocyanate from Example 1 was added to a flask containing 500 g of Polyol B, at 70° C. A clear liquid resulted wherein free isocyanate could no longer be detected.

Example 4

The preparation of a macromer not according to the invention because of its low molecular weight (Macromer D) (a polyol having ethylenically unsaturated terminal groups):

37 g of the isocyanate from Example 1 was added to a flask containing 500 g of Polyol C., at 70° C. A clear liquid resulted wherein free isocyanate could no longer be detected.

Example 5

General guidelines for the preparation of a polymer polyol in accordance with the process of the invention:

A mixture consisting of 238 g styrene, 158 g acrylonitrile, 90 g of ethylbenzene and 4.6 g of 2,2'-azobis-(2-methylbutyronitrile) was uniformly metered over a period of two hours into a mixture of 164 g of polyol C., 36 g of Macromer B (Example 2) and 20 g of isopropanol, under agitation at 120° C. After 10 minutes, this is followed by adding a solution of 0.4 g of 2,2'-azobis-(2-methylbutyronitrile) in 15 g of ethylbenzene to complete the conversion. After a post reaction time of one hour, the residual monomers, regulator residues and solvent are distilled off by vacuum distillation. The product is filtered through a filter cloth having a mesh size of 100 μm without the application of pressure.

The product is a white, agglomerate-free dispersion having a viscosity of 4400 mPa.s/25° C. and a solids content of 43% by wt.

Examples 6 to 10

Using the general guidelines for the preparation of polymer polyols set forth above in Example 5, polymer polyols were produced using the formulations set forth in TABLE 1. These polymer polyols were not in accordance with the present invention. (All amounts given in g).

Example 6 is an example of a polymer polyol produced without the aid of a macromer.

Example 7 is an example of a polymer polyol produced without the aid of a low molecular weight regulator.

Example 8 is an example of a polymer polyol produced with a macromer which is not within the scope of the present invention.

Examples 9 and 10 are examples of polymer polyols produced from a macromer which is not within the scope of the present invention.

Examples 6, 7 and 8 resulted in dispersions which were not stable. Examples 9 and 10 resulted in dispersions which were stable, but were inferior to dispersion according to the present invention with respect to viscosity and discharge behavior.

TABLE 1

|  | Ex. 6 | Ex. 7 | Ex. 8 | Ex. 9 | Ex. 10 |
| --- | --- | --- | --- | --- | --- |
| Polyol A | 36 | | | | |
| Polyol C | 468 | 468 | 468 | 468 | 468 |
| Macromer A | | | | 36 | 36 |
| Macromer B | | 36 | | | |
| Macromer D | | | 36 | | |
| Styrene | 238 | 238 | 238 | 238 | 238 |
| Acrylonitrite | 158 | 158 | 158 | 158 | 158 |
| Toluene | | | | | 90 |
| Ethylbenzene | 90 | 90 | 90 | 90 | |
| Isopropanol | 20 | | 20 | 20 | 20 |
| Stability | poor[1] | poor[1] | poor[1] | good | moderate[2] |
| Discharge | — | — | — | moderate | poor |
| Viscosity mPa · s/ 25° C. | — | — | — | 4800 | 4400 |

[1]Even during polymerization, deposition and the formation of solid, large polymer particles are observed; the products cannot be filtered through a 100 μm filter cloth.
[2]There are problems during filtration.
Discharge very good: no agglomerated particles at all.
Discharge good: agglomerated particles visible.
Discharge moderate: a number of agglomerate particles are clearly visible.
Discharge poor: many agglomerate particles visible.

Examples 11 to 14

Using the general guidelines for the preparation of polymer polyols set forth above in Example 5, polymer polyols were produced using the formulations set forth in TABLE 2. These polymer polyols were in accordance with the present invention.

Example 11 is an example demonstrating that even small amounts of a low molecular weight regulator result in the formation of good products.

Example 12 is an example demonstrating that solvent is not essential to the process of the present invention.

Example 13 is an example demonstrating that when toluene is present as a solvent, and still produce an excellent product with respect to stability, discharge and viscosity.

Example 14 is an example demonstrating that the molecular weight of the macromer can be varied over wide limits, while still producing an excellent product with respect to stability, discharge and viscosity.

TABLE 2

|  | Example 11 | Example 12 | Example 13 | Example 14 |
| --- | --- | --- | --- | --- |
| Polyol C | 468 | 468 | 468 | 468 |
| Macromer B | 36 | 36 | 36 | |
| Macromer C | | | | 27 |
| Styrene | 238 | 238 | 238 | 238 |
| Acrylonitrile | 158 | 158 | 158 | 158 |
| Toluene | | | 90 | |
| Ethylbenzene | 90 | | | |
| Isopropanol | 10 | 20 | 30 | 20 |
| Stability | good | very good | very good | very good |
| Discharge | good | very good | very good | very good |
| Viscosity mPa · s/ 25° C. | 4900 | 5000 | 4000 | 4500 |

Examples 15 to 17

Flexible polyurethane foams were produced in Examples 15–17 using the polymer polyols from the previous examples.

A mixture comprising all of the components (except the polyisocyanate) was intensely mixed. Then, the polyisocyanate was added while stirring. Subsequently, the reaction mixture was poured into an open mold, wherein it foams up to form a flexible foam.

In addition to the components described above, the following components were used to manufacture the flexible foams.

Catalyst 1: A mixture of dimethylethanolamine and bis-N,N-dimethylaminoethyl ether Catalyst 2: Tin octoate Stabilizer: A polyethersiloxane stabilizer, commercially available from Goldschmidt, Essen Isocyanate: Toluylene diisocyanate (commercially available from Bayer AG as Desmodur® T80)

Polyol E: A trimethylolpropane started polyether, produced by the addition of polypropylene oxide and ethylene oxide, and having a molecular weight of 3700 g/mol

TABLE 3

Flexible foam examples (all amounts in parts by wt.)

|  | Example 15 | Example 16 | Example 17 |
| --- | --- | --- | --- |
| Catalyst 1 | 0.15 | 0.15 | 0.15 |
| Catalyst 2 | 0.17 | 0.17 | 0.17 |
| Stabilizer | 0.8 | 0.8 | 0.8 |
| Water | 3.5 | 3.5 | 3.5 |
| Polymerpolyol (Ex. 5) | 25 | | |
| Polymerpolyol (Ex. 12) | | 25 | |
| Polymerpolyol (Ex. 14) | | | 25 |
| Polyol E | 75 | 75 | 75 |
| Isocyanate | 43.4 | 43.4 | 43.4 |
| Isocyanate Index | 108 | 108 | 108 |
| Density (kg/m³) | 29 | 28 | 28 |
| Open-cell character | high | high | high |
| Compressive strength (kPa) | 4.8 | 4.8 | 5.0 |
| Feel | good | good | good |
| Elasticity | good | good | good |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of stable, agglomerate-free, low-viscosity graft copolymer dispersions by polymerizing 25 to 65% by weight, based on the total weight of the dispersion, of ethylenically unsaturated monomers in the presence of a base polyol, a macromer, and a low-molecular weight regulator, wherein said macromer has a molecular weight of 4700 to 15,000 and a functionality of 2 to 6, and said macromer is prepared by reacting a polyol which has a molecular weight of 4500 to 15,000 and a functionality of 2 to 6 with an isocyanate which is the reaction product of one or more ethylenically unsaturated, low-molecular weight monohydroxy acrylates with one or more polyisocyanates, and wherein said macromer contains from 0.1 to 1 moles of double bonds per mole of polyol.

2. The process of claim 1, wherein an organic solvent is additionally present during said polymerization.

3. The process of claim 1, wherein said ethylenically unsaturated monomers are selected from the group consisting of styrene, acrylonitrile, and mixtures thereof.

4. The process of claim 3, wherein said ethylenically unsaturated monomers comprises a mixture of styrene and acrylonitrile in a weight ratio of 20:80 to 80:20.

5. The process of claim 4, wherein the weight ratio of said mixture of styrene and acrylonitrile is 70:30 to 30:70.

6. The process of claim 1, wherein said base polyol comprises a polyalkylene oxide containing at least two hydroxyl groups, a functionality of 2.5 to 6 and an OH value of 20 to 100.

7. The process of claim 1, wherein said low-molecular weight regulator is selected from the group consisting of methanol, ethanol, isopropanol, or mixtures thereof.

8. The stable, agglomerate-free, low-viscosity graft copolymer dispersion produced by the process of claim 1.

9. In a process for the production of polyurethane plastics comprising reacting an isocyanate with a polyol via the isocyanate addition process, the improvement wherein said polyol comprises the graft copolymer dispersion produced by the process of claim 1.

* * * * *